United States Patent [19]
Bartram et al.

[11] Patent Number: 5,116,512
[45] Date of Patent: May 26, 1992

[54] METHOD OF CHEMICAL DECONTAMINATION

[75] Inventors: Philip W. Bartram, Abingdon; Noel C. DiBona, Aberdeen Proving Ground, both of Md; James H. Buchanan, Newark, DE; Dennis K. Rohrbaugh, Bel Air, MD.

[73] Assignee: The United States of America as represented by the Secretary of the Army, Washington, D.C.

[21] Appl. No.: 718,320

[22] Filed: Jun. 17, 1991

[51] Int. Cl.⁵ .............................................. B01D 15/04
[52] U.S. Cl. ...................................... 210/690; 210/908; 210/911
[58] Field of Search ................ 210/634, 679, 661, 662, 210/663, 689, 690, 908, 911

[56] References Cited

U.S. PATENT DOCUMENTS

| | | | |
|---|---|---|---|
| 3,531,463 | 9/1970 | Gustafson | 210/490 |
| 4,842,746 | 6/1989 | Fowler et al. | 210/689 |
| 4,874,532 | 10/1989 | Worley | 210/909 |

Primary Examiner—Robert A. Dawson
Assistant Examiner—Ana Fortuna
Attorney, Agent, or Firm—Anthony T. Lane; Edward Goldberg; Edward F. Costigan

[57] ABSTRACT

An absorption process of using polydivinylbenzene to remove nerve agents such as GD from a conventional solvent such as chlorofluorocarbon which itself is used to decontaminate a surface such as armament.

1 Claim, 2 Drawing Sheets

METHOD OF CHEMICAL DECONTAMINATION

GOVERNMENTAL INTEREST

The invention described herein may be made, used or licensed by or for the Government for governmental purposes without the payment to us of any royalties thereon.

FIELD OF USE

This invention relates to the decontamination of a chemical solvent containing pinacolyl methylphosphonofluoridate, also known as GD.

More particularly, this invention relates to the adsorption of GD from a chlorofluorocarbon solvent by a macroreticular strong acid resin.

BACKGROUND

At present, a nonaqueous equipment decontamination system (NAEDS) provides the U.S. Army with the capability to remove chemical agent contamination from electronics, avionics, and other items sensitive to conventional decontaminating solutions.

The present system of the art includes a chlorofluorocarbon (CFC) spray, which removes the chemical warfare agent (CWA) from the item of interest. The resulting CFC solvent containing the CWA is processed by mixing with sodium hypochlorite in a conventional mixer. The CFC solvent is then separated from the aqueous hypochlorite by decanting, and then by distilling off the solvent CFC.

The system now in use was developed for operation in a large facility or plant. Therefore, the size and weight of the system was never critical. However, due to the fact that the decontaminating equipment was too large, heavy, and energy intensive, it could not be easily adapted to a mobile unit for use in the field.

SUMMARY OF THE INVENTION

It is an object to provide an adsorption process that could be utilized to remove nerve agent (GD) from a conventional solvent, such as a chlorofluorocarbon.

A still further object is to provide an adsorption process that could be utilized to remove pinacolyl methylphosphonofluoridate from 1,1,2-trichloro-1,2,2-trifluoroethane utilizing a polydivinylbenzene macroreticular strong acid resin.

Other objects and many of the attendant advantages of this invention will become more evident from a reading of this specification when taken with the accompanying drawings, wherein.

In considering whether a macroreticular strong acid resin could be utilized to decontaminate CFC containing GD, two major criteria were in point. If these two criteria could be satisfied, then the NAEDS purification system could merely be replaced by an adsorption column which is a smaller unit, and could be made mobile.

First, the rate of sorption of the chemical warfare agent (CWA) from the contaminated CFC solvent by the resin must be significantly greater than the rate of sorption of the CFC solvent itself by the resin.

Second, the rate of agent desorption from the column material containing the resinous material should be significantly less than the rate of sorption of the CWA by the resin.

This invention relates to the purification of CFC contaminated with GD, a chemical warfare agent, utilizing state-of-the-art sorption technologies. It focuses on the feasibility of removing pinacolyl methylphosphonofluoridate referred to herein as GD, from a chlorofluorocarbon solvent named 1,1,2-trichloro-1,2,2-trifluoroethane utilizing a macroreticular strong acid resin named polydivinylbenzene. The resin is commercially named Amberlite XE-393 obtained from Rohm and Haas Company, Philadelphia, Pennsylvania.

PREFERRED EMBODIMENT MATERIALS

Figure 1:
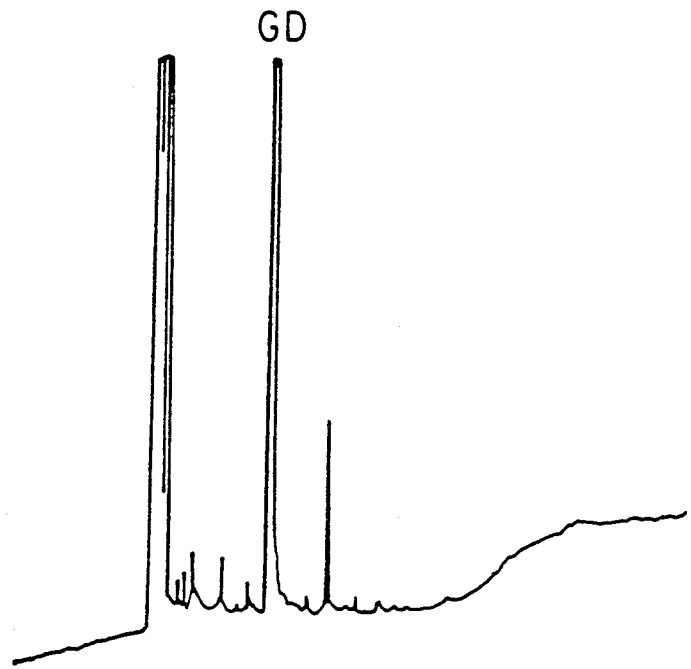
FIG. 1 shows a chromatogram of the conventional chemical warfare agent called a nerve agent (GD).

The GD sample (Lot No. GD-U-6157-CTF-N-2) used in these experiments was obtained from the Chemical Agent Standard Analytical Reference Material (CASARM) Program at the U.S. Army Chemical, Research, Development and Engineering Center (CRDEC). Originally synthesized in Jun. 1986 and determined to be 99.3% (w/w) pure by multinuclear Nuclear Magnetic Resonance (NMR) Spectroscopy, this particular sample was recently monitored ($^{31}$P NMR, Mar. 1990) with no degradation detected. The composition of the GD sample is shown in Table 1 which follows. The GC determined purity of the neat GD sample was 94.7% by area using a Flame Ionization Detector (FID). The chromatogram of 1% GD in CFC is shown in FIG. 1.

TABLE 1

| CHARACTERIZATION OF GD BY NMR | | |
|---|---|---|
| Compound | Mole % | Weight % |
| GD isomers | 98.9 | 99.3 |
| difluoro | 0.04 | 0.02 |
| GD acid | 0.1 | 0.1 |
| iPr-N=C=N-iPr | 0.7 | 0.5 |
| unknown | 0.3 | 0.1 |

The solvent, 1,1,2-trichloro-1-2,2-trifluoroethane, was obtained from E. I. Dupont de Nemours, Wilmington, Delaware. GC analysis using an FID resulted in an area % purity of 99.99. The only impurity eluted 12 seconds before the main peak using a 30 meter methylsilicone capillary column at 35 degrees C.

Amberlite XE-393 (Lot 84/0079), a polydivinylbenzene ion ex change resin, was supplied by Rohm and Haas Company, Philadelphia, PA. The black spherical resin beads, with a surface area of 410 m$^2$/g, and a 20/50 mesh range, were used as received.

EQUIPMENT

An HP 5880A GC equipped with an FID was used in this study. This GC equipment is commercially available from Hewlett Packard Company, Valley Forge, Pennsylvania. The analysis of GD was accomplished using a 30 meter fused silica capillary column (0.32 mm I) with a 0.25 μm film of methylsilicone (Alltech Econocap Series SE30). The carrier gas was helium split at a 50:1 ratio. Pressure controlled (47 KPa) column flow resulted in a calculated helium flow of 22.7 cm/sec (1.1 mL/min) based on the retention gap (2.2 minutes) obtained for methane at 40 degrees C. Detector make-up flow was helium at a rate of 23 mL/min.

The injection port temperature was 225 degrees C. and the detector temperature was 300 degrees C. The column oven temperature was programmed from 75 to 275 degrees C. at 20 degrees C./min and held at 275 degrees C. for 10 minutes. The combustion gases were hydrogen and air, at 32 and 420 mL/min. A Hamilton 7001 SN microliter syringe was used to manually inject 1.0 μL sample volumes. Area integration of the resulting chromatographic peaks was accomplished electronically.

PROCEDURE

Sample Preparation

To determine the adsorption efficiency of Amberlite XE-393 resin, a master dilution of GD in CFC was prepared. To 100 μL (102.20 mg) of GD, 10 mL of CFC were added volumetrically. This solution was transferred to a 10 mL glass reaction vial containing a small, teflon-coated magnetic stirbar, and sealed with a teflon-lined silicone septum and an aluminum crimp cap. This 1% (v/v) GD solution served as both the experimental sample for resin adsorption testing and as the master standard for further dilution and calibration in the concentration range of interest. This concentration was calculated to be the maximum agent concentration challenged by the NAEDS.

Duplicate samples were prepared by the addition of 2.0 mL of the master standard solution (1% GD in CFC) to each of two 10 mL glass reaction vials containing a small, cylindrically shaped, teflon-coated, magnetic stirbar and 200 mg of Amberlite XE-393 resin. The vials were sealed with a teflon-lined silicone septum and an aluminum crimp cap. The mixtures were stirred at 500 rpm. Stirring was interrupted after 10 minutes, two hours, and four hours to enable sampling of the liquid with a Hamilton 7001SN microliter syringe. For each sampling, a ⅜-inch, 25 gauge stainless steel needle was used to vent the sample to assure exactly 1.0 μL of liquid was withdrawn. During periods when the sample was not being stirred, the resin separated from the GD/CFC solution. The lower layer, containing GD and CFC, was sampled for chromatographic analysis. All work was performed at room temperature (25±1 degrees C.) in an air atmosphere.

Calibration

A series of dilutions were prepared volumetrically from the 1% GD in CFC master standard. A 1.0 μL aliquot of each was injected manually into the GC using the conditions and parameters heretofore described. GD eluted as a pair of isomers with retention times of 4.73 and 4.76 min. The areas of these two peaks were summed for quantitative purposes. The GD chromatogram is given in FIG. 1. Excellent reproducibility (±1%) was obtained for sample concentrations in the range of interest.

Figure 2:
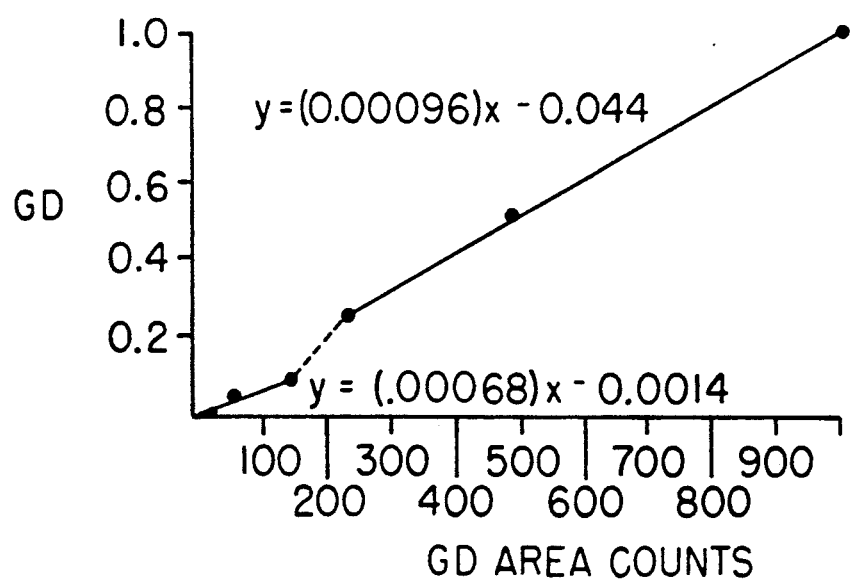
FIG. 2 shows a chromatographic calibration curve showing the interrelationship between the concentration of GD expressed as volume percent in chlorofluorocarbon and GD expressed as area counts.

Quantitative analysis of GD in CFC was accomplished using gas chromatography. A calibration curve was generated relating GD area counts to a known concentration of GD in CFC. GD area counts obtained for experimental samples of unknown GD concentration which had been exposed to the resin in the CFC solvent were quantitated based on this linear relationship. FIG. 2 reveals two lines with significantly different slopes. The line defined by the relationship $y = (0.00096)x + 0.044$ was used to determine the GD concentrtion for experimental samples when the GC area count for GD was greater than 220. When the count was less than 150, $y = (0.00066)x + 0.0014$ was used. Since experimental data did not fall between these two values (FIG. 2, dashed line), interpolation was not required.

Minimum Detectable Level

The FID Minimum Detectable Level (MDL) for GD was determined to be 1 ng with a signal of better than twice the noise level for a 1.0 μL injection of GD in CFC. This corresponds to 0.0001% (v/v) GD concentration in CFC. Since 1% GD in CFC was chosen as the starting concentration for adsorption testing with Amberlite XE-393, the described procedure detected GD at the MDL after 99.99% had been adsorbed.

Adsorption Criteria

Two major criteria were considered in evaluating the NAEDS purification system for replacement by an adsorption column. First, the rate of sorption of threat chemical warfare agent from the contaminated CFC solvent must be significantly greater than the rate of sorption of the CFC solvent by the resin. Ideally, the CFC solvent would function solely to carry the agent to the sorption material. Second, the rate of agent desorption from the resinous column material should be significantly less than the rate of sorption.

GD Absorption Data

Table 2 below presents a summary of the data obtained for this series of static adsorption experiments carried out using a concentration of 10 mL of GD per liter of CFC solvent. Samples "I" and "J" contained 200 mg Amberlite XE-393 resin in 2.0 mL of CFC solvent, or 10% (w/v). Inspection of GC adsorption data (Table 3) revealed that the major GD impurity/decomposition product (unknown, peak 1) was not adsorbed. All other GD impurities were adsorbed in less than four hours. The compound that elutes at 3.1 min appears to be both an initial GD impurity and a decomposition product. It was adsorbed, increased in concentration, and then the remainder was adsorbed. Desorption of the initial impurity was also feasible since the concentration detected never rose above the initial level.

TABLE 2

GD ADSORPTION BY AMBERLITE XE-393 RESIN
Percent GD Adsorbed by Amberlite XE-393 Resin

| Time | Sample "I" | Sample "J" |
| --- | --- | --- |
| 10 min | 91.7 | 92.4 |
| 2 hours | 97.9 | 98.5 |
| 4 hours | 99.8 | 99.5 |

Rate of GD Adsorption

Figure 3:
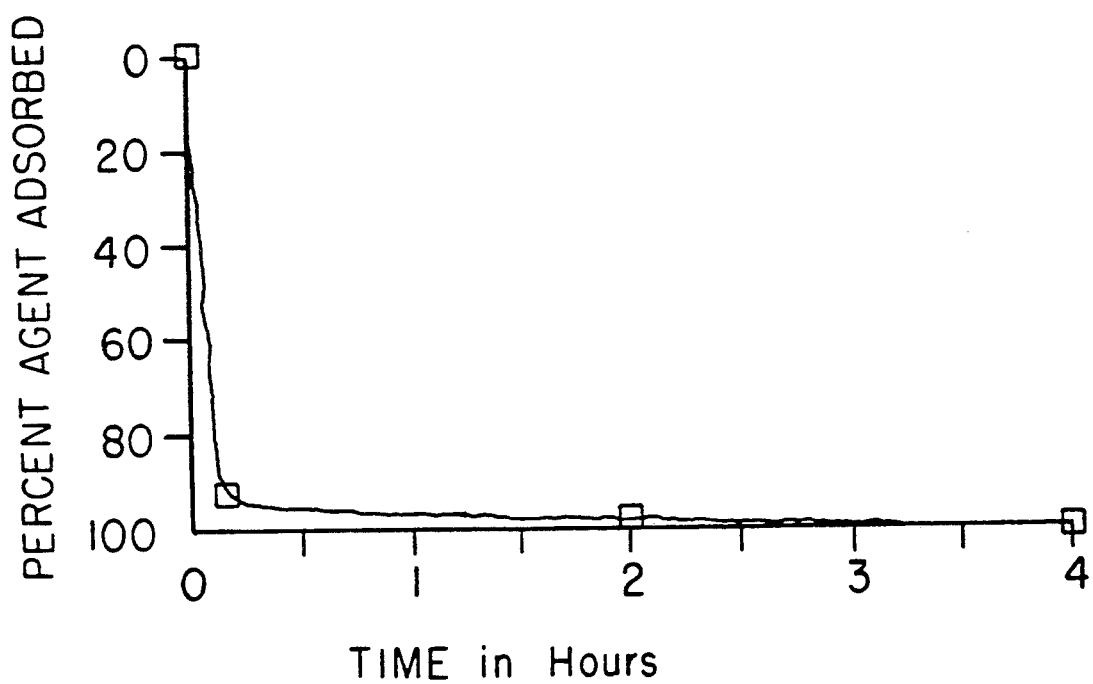
FIG. 3 is a graph of the percent of GD in a chlorofluorocarbon solvent (CFC) absorbed by the resin of the present invention in time expressed as hours.

The rate of GD adsorption is depicted graphically in FIG. 3. The rate of GD adsorption by Amberlite XE-393 resin is greater than the rate of CFC adsorption. The rate of GD desorption from the resin material is less than the rate of GD adsorption. These two major criteria which were established show that the basis for the potential replacement of the huge NAEDS purification system have been met under the conditions tested.

The rate of GD adsorption is most significant during the initial stages of each experiment. During the first 10 minutes, about 92% of the GD initially present in the CFC mixture had been retained by the resin. After two hours, an additional 6% had been adsorbed. The rate of GD adsorption for the final 2% was significantly reduced over the final two hours of monitoring.

Chlorofluorocarbon Solvent Assessment

The quality of purified freon required for optimum NAEDS operation should be defined. Raw data from this study (see Table 3) indicates that the Amberlite XE-393 resin was very efficient in removing GD from contaminated CFC. The resulting purified CFC contained trace levels of GD and a significant level of the unidentified GD impurity/decomposition product that eluted immediately after the solvent peak. All other GD impurities were totally adsorbed.

No evidence of resin-induced CFC decomposition was detected in a control sample. The major CFC impurity detected by gas chromatography was preferentially adsorbed by Amberlite XE-393 resulting in a recovered product of greater purity.

The feasibility of transforming that this resin may be used for CFC purification into a practical operating system is proven.

CONCLUSIONS

The following conclusions can be drawn from this work: Amberlite XE-393, a macroreticular, strong acid resin, removed GD from GD-contaminated 1,1,2-trichloro-1,2,2-trifluoroethane. Samples mixed for ten minutes, two hours, and four hours showed resin adsorption efficiencies for GD of 92%, 98%, and greater than 99 respectively.

The foregoing disclosure is merely illustrative of the principles of this invention and is not to be interpreted in a limiting sense. We wish it to be understood that we do not desire to be limited to the exact details of construction shown and described, because obvious modifications will occur to a person skilled in the art.

TABLE 3

GAS CHROMATOGRAPHIC RESULTS: ADSORPTION OF GD BY AMBERLITE XE-393

| Peak Number | | Retention Time min | GD Area Counts by GC-FID | | | | | | | |
|---|---|---|---|---|---|---|---|---|---|---|
| | | | Sample "I" | | | | Sample "J" | | | |
| | | | 0 hr | 10 min | 2 hr | 4 hr | 0 hr | 10 min | 2 hr | 4 hr |
| 1 | | 2.8 | 83 | 25 | 199 | 352 | 83 | 32 | 192 | 299 |
| 2 | | 3.1 | 0.7 | 0.0 | 0.5 | 0.0 | 0.7 | 0.1 | 0.4 | 0.0 |
| 3 | | 3.2 | 1.2 | 0.0 | 0.0 | 0.0 | 1.2 | 0.0 | 0.0 | 0.0 |
| 4 | | 3.3 | 1.6 | 0.0 | 0.0 | 0.0 | 1.6 | 0.0 | 0.0 | 0.0 |
| 5 | | 3.8 | 1.0 | 0.0 | 0.0 | 0.0 | 1.0 | 0.0 | 0.0 | 0.0 |
| 6 | | 4.1 | 0.1 | 0.0 | 0.0 | 0.0 | 0.1 | 0.0 | 0.0 | 0.0 |
| 7 | | 4.3 | 0.6 | 0.0 | 0.0 | 0.0 | 0.6 | 0.0 | 0.0 | 0.0 |
| 8 | (GD) | 4.8 | 994 | 124 | 30 | 0.7 | 994 | 114 | 21 | 5.1 |
| 9 | | 5.5 | 0.3 | 0.0 | 0.0 | 0.0 | 0.3 | 0.0 | 0.0 | 0.0 |
| 10 | | 5.8 | 4.6 | 0.0 | 0.0 | 0.0 | 4.6 | 0.0 | 0.0 | 0.0 |
| 11 | | 6.4 | 0.4 | 0.0 | 0.0 | 0.0 | 0.4 | 0.0 | 0.0 | 0.0 |
| 12 | | 7.3 | 1.1 | 0.0 | 0.0 | 0.0 | 1.1 | 0.0 | 0.0 | 0.0 |

RELEVANCE OF THE ABOVE DATA

The 1% agent concentration in CFC was chosen since it appears to be the maximum theoretical threat of agent that the huge NAEDS system might encounter. Amberlite XE-393 efficiently removes GD from contaminated CFC in a timely manner under the "static" conditions of the procedure of this invention.

What is claimed is:

1. In an improved method of decontaminating 1,1,2-trichloro-1,2,2-trifluoroethane which contains pinacolyl methylphosphonofluoridate, the improvement consisting essentially of using polydivinylbenzene to absorb up to about 99.5 percent of said pinacolyl methylphosphonofluoridate from said solvent, said polydivinylbenzene being present at about 10 percent weight/volume based on said solvent.

* * * * *